United States Patent Office 3,824,156
Patented July 16, 1974

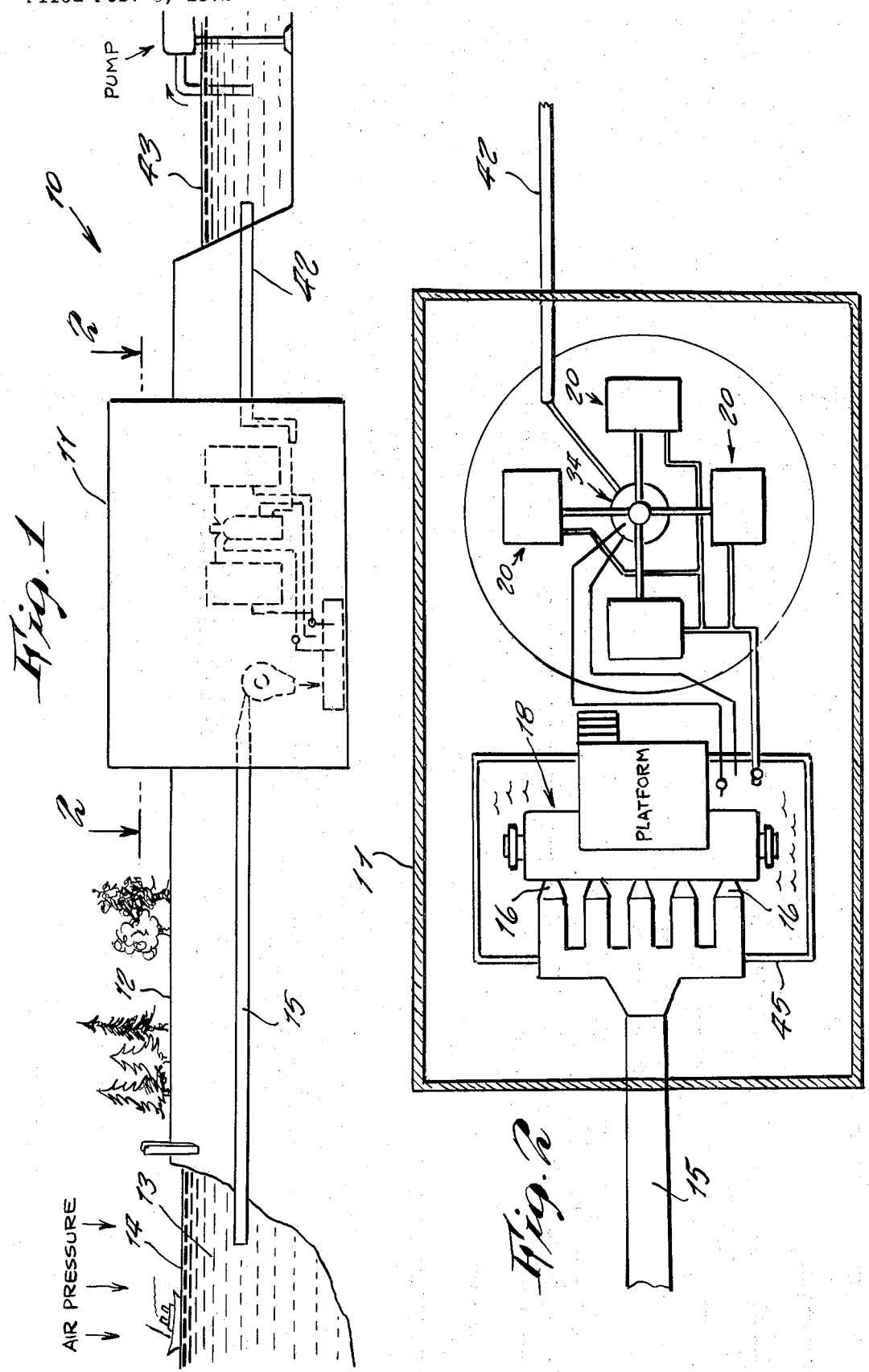

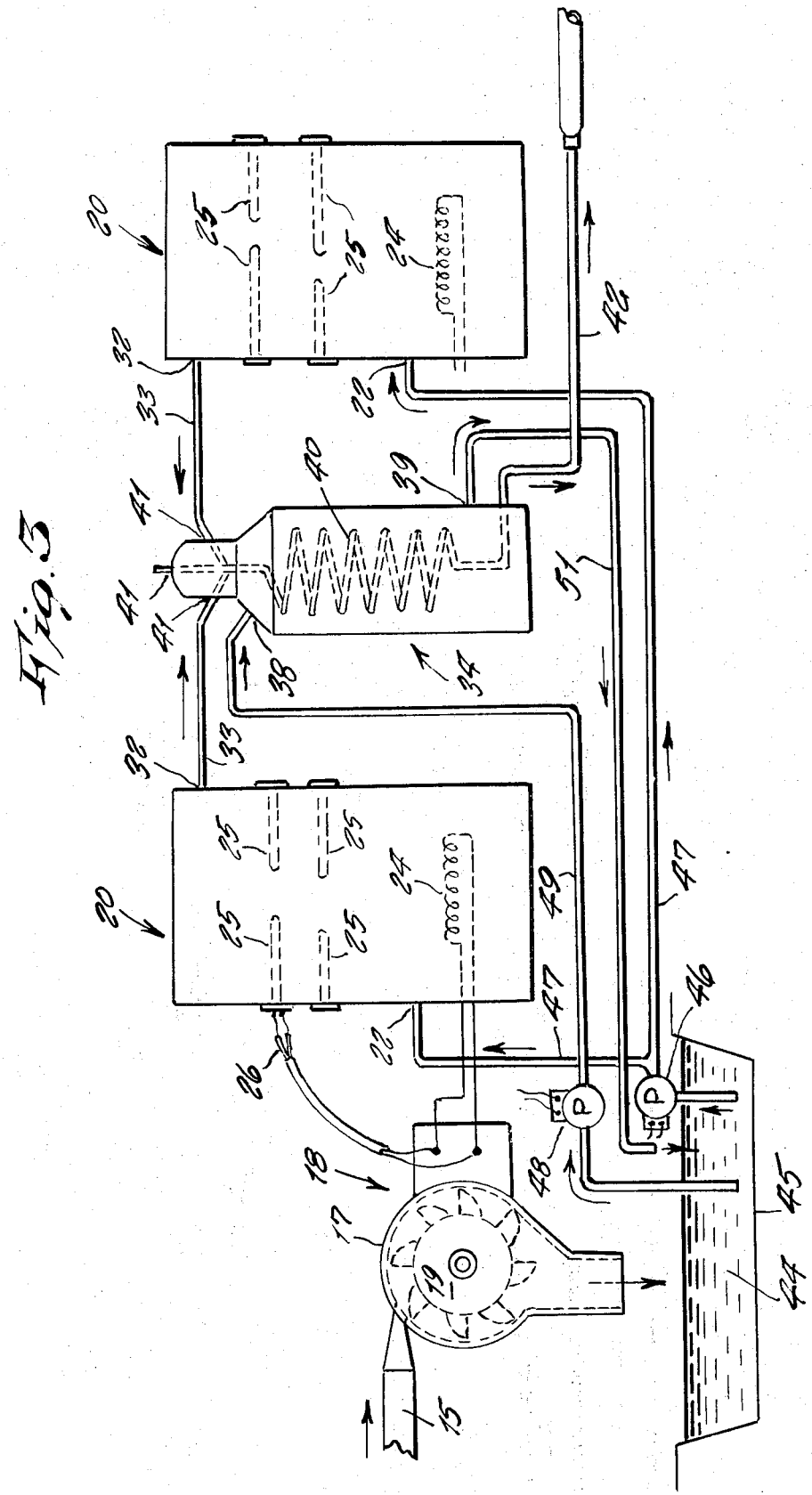

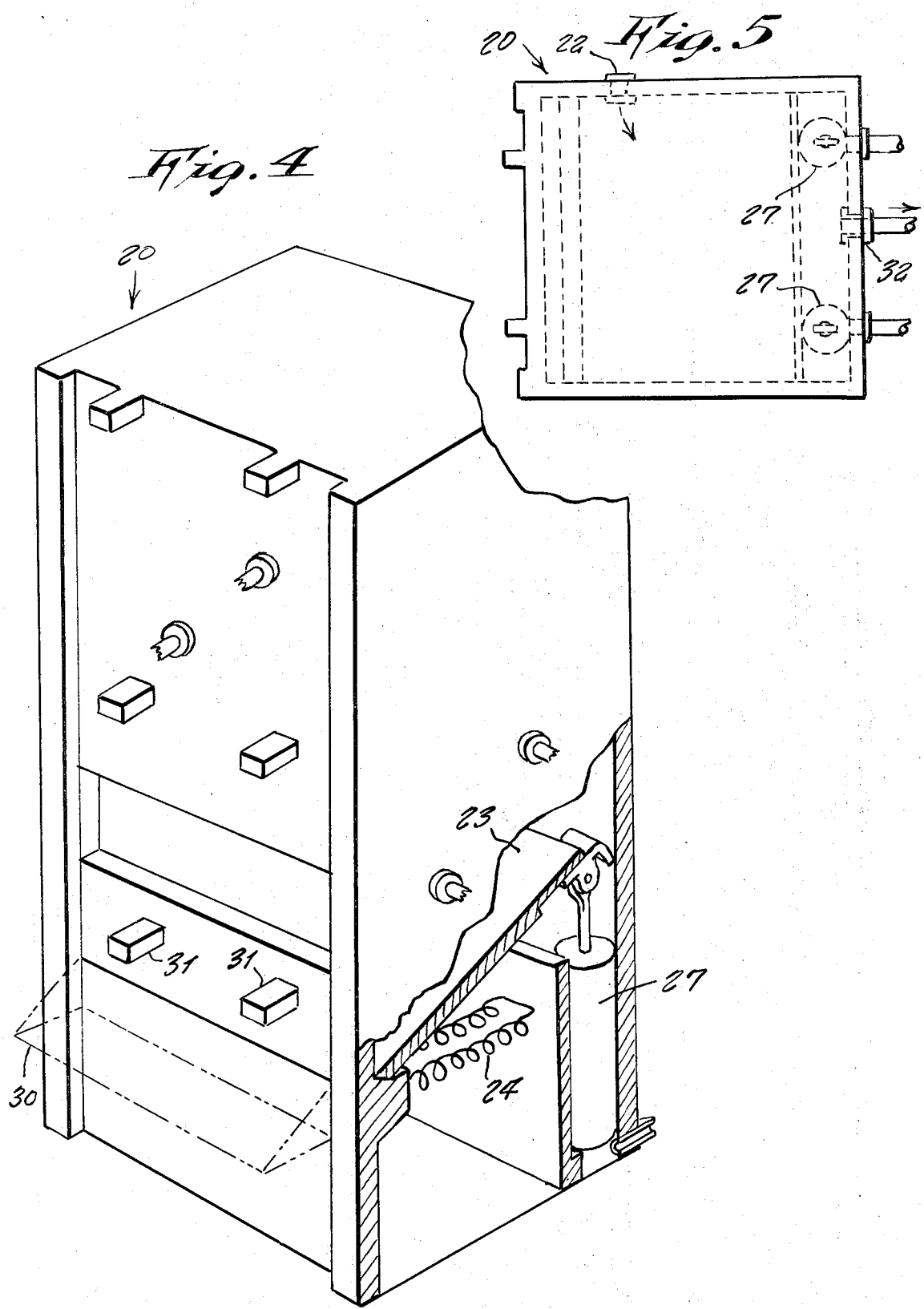

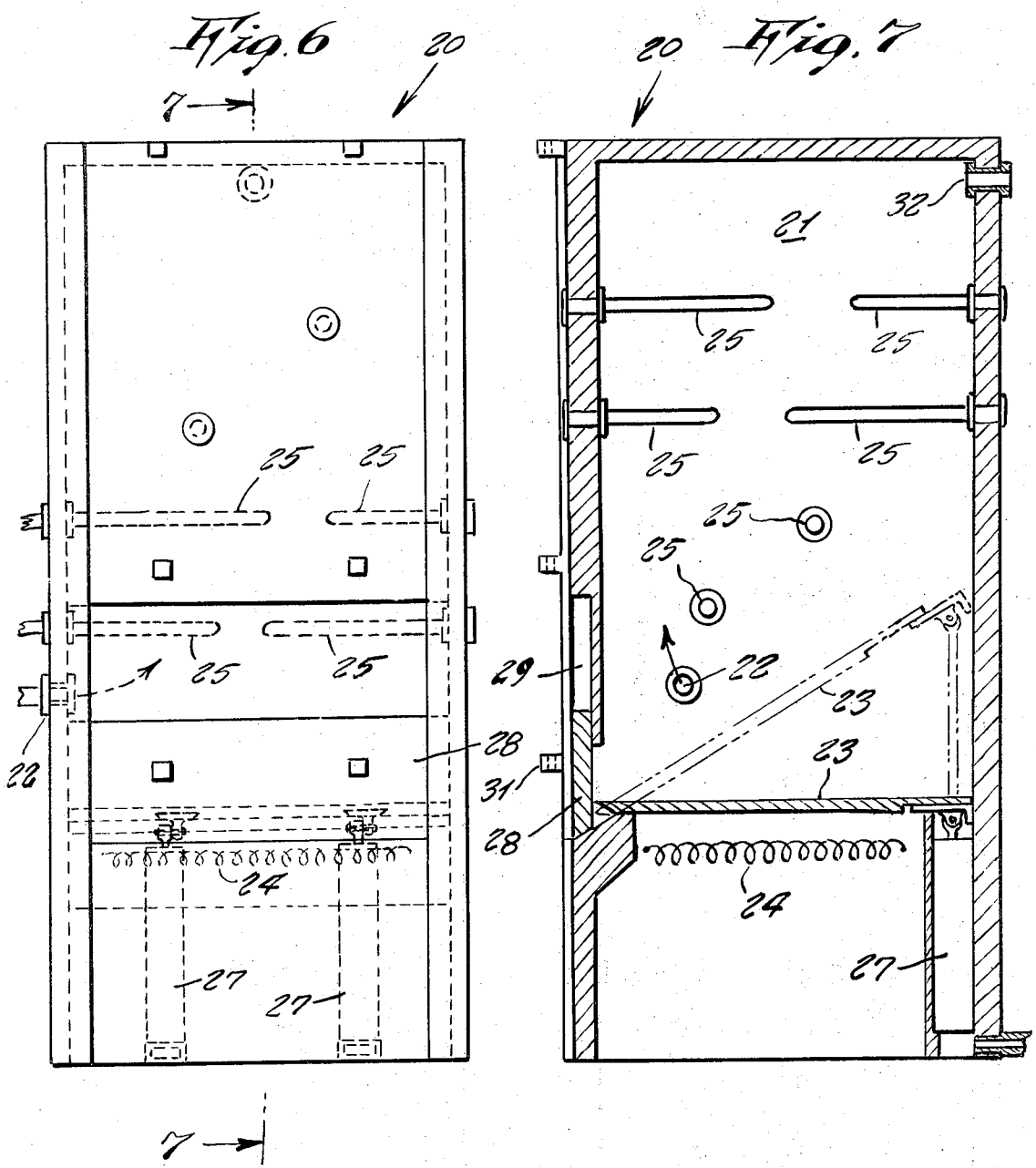

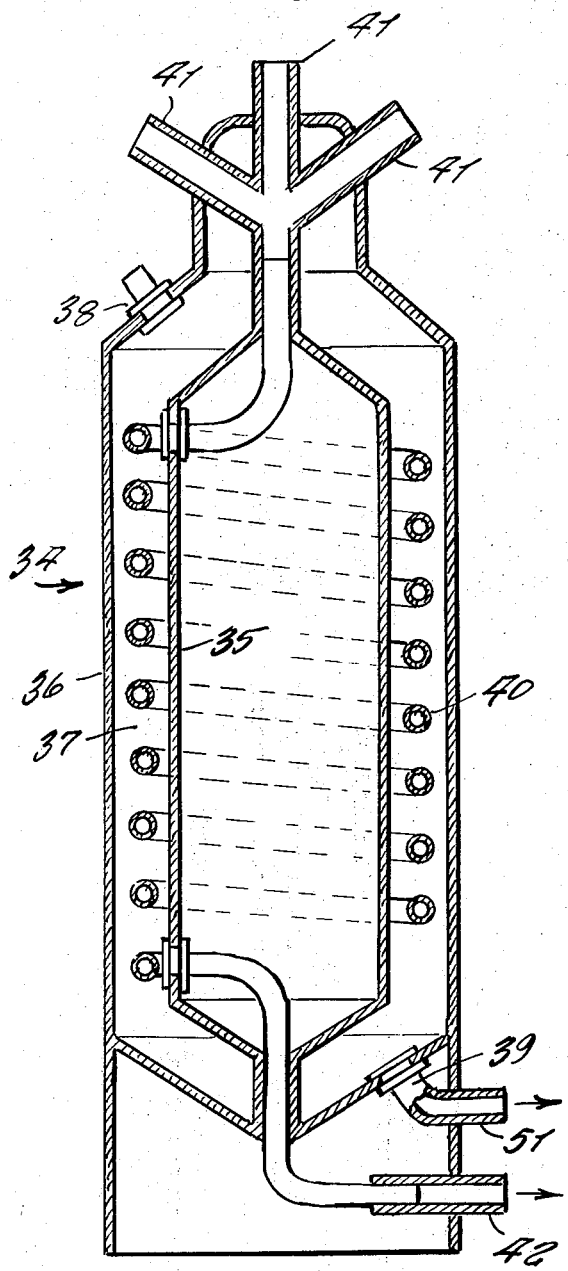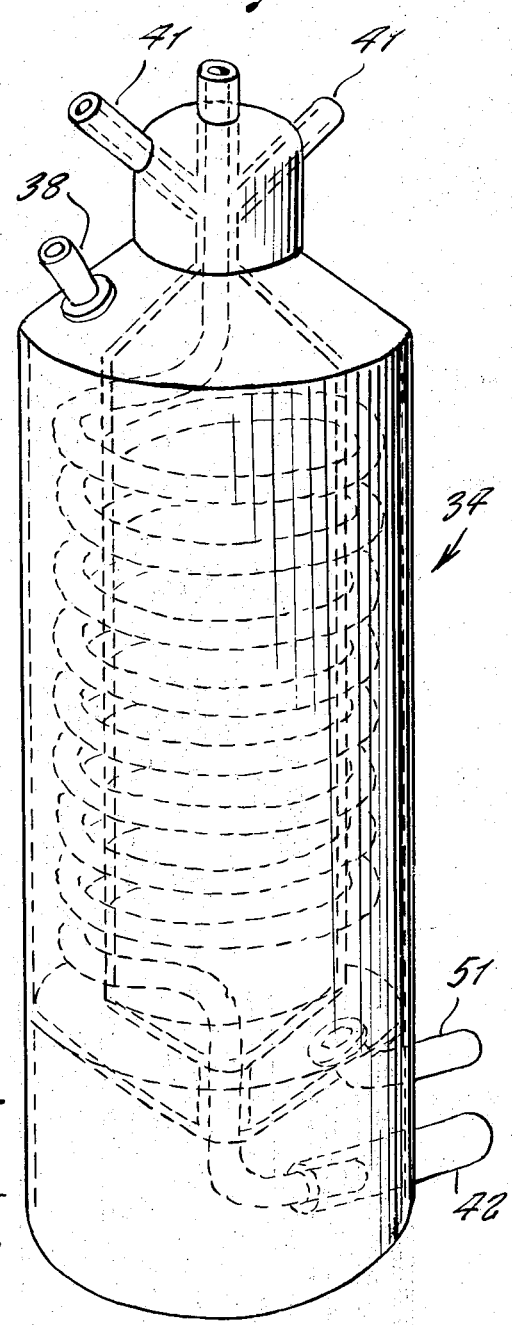

3,824,156
DESALINIZATION SYSTEM
Alphonso Griffin, 1308 Seldon Ave.,
Norfolk, Va. 23523
Filed Feb. 8, 1972, Ser. No. 224,541
Int. Cl. B01d 3/02
U.S. Cl. 202—180      6 Claims

ABSTRACT OF THE DISCLOSURE

A system and apparatus for removing salt from sea water so to render it into fresh water for drinking, washing and other practical purposes; the apparatus consisting of a station to which salt sea water is piped, the station having electric generators driven by a turbine powered by the incoming salt water, the station including boiler tanks in which the salt water is boiled so that steam therefrom is piped to a condenser from which distilled, pure fresh water is piped to a fresh water storage reesrvoir, and the electric generator supplying energy to electric heaters for boiling the salt water, driving pumps and powering all the equipment at the station.

---

This invention relates generally to desalinization machinery.

A principal object of the present invention is to provide a desalinization system which is practical in converting salt sea water into fresh and pure water for drinking, bathing and other purposes.

Another object is to provide a desalinization system which is designed to be practical on a large scale so to furnish abundant fresh water to a municipality or a large industrial plant.

Another object is to provide a desalinization system having the advantage of producing a new energy source.

Yet a further object is to provide a desalinization system which can purify any brackish water other than salt water and distill it into pure wholesome fresh water free of all salts, minerals, organisms, and chemicals.

Other objects are to provide a desalinization system which is simple in design, inexpensive to manufacture, rugged in construction, easy to use, and efficient in operation.

These and other objects will be readily apparent upon a study of the following specification and the accompanying drawing, wherein:

FIG. 1 is a side view of the present invention.

FIG. 2 is a cross-sectional view taken on line 2—2 of FIG. 1 and illustrating the machinery within the station.

FIG. 3 is a diagrammatic side view of the water circulation system and electrical circuit within the station.

FIG. 4 is a perspective view of one of the boiler units, shown partly in cross section so to illustrate the interior thereof.

FIG. 5 is a top view thereof.

FIG. 6 is a front view thereof.

FIG. 7 is a cross-sectional view taken on line 7—7 of FIG. 6.

FIG. 8 is a perspective view of the condenser unit.

FIG. 9 is a longitudinal cross-sectional view thereof.

Referring now to the drawing in detail, the reference numeral 10 represents a desalinization system according to the present inventon, wherein there is a purification plant or station 11 upon a land 12, adjacent a body of salt sea water 13. The station is shown exetnding 200 feet down below sea level 14, and a salt water supply pipe or duct 15 located 100 feet below sea level runs underground from the sea to the station. The end of the pipe in the station is branched to form a series of pressure jets 16, each of which is convergingly tapered to its end for increasing pressure force. The jets 16 are connected to a cylindrical housing 17 of a horizontal generator 18 which includes a turbine rotor 19 that is forced to turn by the rushing water from the jets. The spinning rotor carries permanent magnets so to form a rotating magnetic field thus inducing electrical charge in a stator coil so to produce electrical energy.

In the station 11, there are a battery of boiler units 20, each one of which includes a boiler tank 21 into which salt water is placed through inlet 22. The bottom of the tank 21 comprises an upwardly tiltable heating plate 23 below which there is an electric heating coil 24. A series of sidewardly extending electric heater calrods 25 project into the interior of the tank. The calrods 25 and coil 24 are powered by electrical conductors 26 from the generator 18. In practical construction it may prove that the calrods 25 may be used alone without the coil 24, however, both are shown in the invention so to prevent any infringement on this invention by anyone using either one. A pair of air cylinders 27, electrically powered from the generator 18, serve to raise the heating plate 23 at such time as the boiler tank is to be cleaned out and the salt residue deposited upon plate 23 is to be scraped off. A residue door 28 slidable into recess 29 allows access to scrape off the salt residue from the plate 23 and move the residue out of the boiler upon a residue extension plate 30 externally located. The base edge of the door 28 is angled to form a continued inclined face with the plate 23 when tilted.

Pulley tracks 31 are needed to raise the residue door 28. The pulley tracks guide cable lines to lift the door, the lines extending to winches on the ceiling of the station building, the winches being powered from the generator.

The residue door inset 29 prevents water escape when the door is closed. A door lip keeps the residue door tight when closed.

A steam outlet 32 near the boiler top is connected by pipe 33 to a condenser 34. The condenser includes inner jacket 35 and outer jacket 36 between which there is a water chamber 37 having inlet 38 near the top, and outlet 39 near the bottom. A coil pipe 40 is in the chamber 37, the upper end of the coil connected to one of the inlets 41 from the various boiler units 20, and the lower end of the coils being connected by an outlet to a dscharge pipe 42 that dispenses the distilled pure water into a fresh water reservoir 43.

In operation, the salt water flowing from below the sea drives the generator 18 so to produce power to run the purification plant. The water 44 after driving the generator is dscharged into a salt water pool 45 at the plant 11, as shown in FIG. 3. The salt water from the pool is pulled by a pump 46 through pipe 47 to the boiler units so to be desalinated and turned to steam that is delivered to the condenser from where, after turning to fresh water, it is delivered to reservoir 43. In order for the steam to condense in the condenser coil 40, cold salt water 44 from pool 45 is pulled by a pump 48 through pipe 49 to inlet 41, through the chamber 37 where it cools the coil 40, then out of chamber 37 through the outlet 39 into a discharge pipe 51 that spills back into pool 45, all as shown in FIG. 3.

All the parts through which the corrosive salt water flows shall be of plastic or special material coated so to not have affinity for formation of clogging salt crust therein, or corroded by salt.

Thus a large-scale desalination system of production of fresh water is presented.

While various changes may be made in the detail construction, it is understood that such changes will be within the spirit and scope of the present invention as is defined by the appended claims.

I claim:
1. In a desalination system for conversion of salt sea water or brackish water into pure fresh water, the combination of a purification plant extending below sea level being connected to one end of a salt water intake duct located below sea level, the other end of the duct being connected to the underwater part of a salty sea so that salt water flows to said plant where it is purified, said plant including an electric generator driven by said salt water entering said plant, a plurality of boiler units in which said salt water is boiled so to form steam, a condenser unit wherein said steam from said boiler units is condensed into distilled fresh water and from which it flows to a fresh water reservoir, said plant including a salt water pool in which said salt water after driving said generator is discharged and from which it is pumped into said boiler units, said condenser unit including a chamber containing a coil into which said steam is discharged and wherein said steam condenses, said chamber being connected to an inlet pipe and outlet pipe connected to said pool so that said salt water cools said coil, electric heater calrods in a boiler tank of each said boiler unit heating said salt water, said calrods being powered by said generator, said boiler tank including a heating plate forming a bottom wall thereof, said plate being upwardly inclinable so to scrape off crusted salt deposited thereupon during desalination, and a pair of air cylinders electrically powered by said generator being located below one end of said heating plate so to raise said heating plate into an inclined position, a heating coil being located below said heating plate.

2. The combination as set forth in Claim 1, wherein a residue door on a side of said tank is movable to provide access to said inclined plate during salt crust cleanup time.

3. The combination as set forth in Claim 2, wherein a residue extension plate externally of said tank is adaptable to receive salt crust residue removed from said plate.

4. The combination as set forth in Claim 3, wherein pulley tracks are provided to raise said residue door.

5. The combination as set forth in Claim 4, wherein said pulley tracks are connected by lines to winches on a ceiling of said plant.

6. The combination as set forth in Claim 5, wherein all parts of said system through which said salt water flows are plastic or special material coated so as to not have affinity for formation of clogging salt crust therein or being corroded by said salt, said parts comprising said intake duct, said pool, and all such internal components of said turboelectric generator, boiler units and condenser whose surfaces contact said salt water.

References Cited

UNITED STATES PATENTS

| | | | |
|---|---|---|---|
| 3,468,762 | 9/1969 | Klitzsch | 203—10 X |
| 3,338,797 | 8/1967 | Hermansen et al. | 203—10 X |
| 3,397,119 | 8/1968 | Bourland | 203—11 |

NORMAN YUDKOFF, Primary Examiner

D. EDWARDS, Assistant Examiner

U.S. Cl. X.R.

60—26, 64; 202—185 D, 234; 203—10, 100, Dig 20, 86; 219—312